United States Patent [19]

Wood

[11] Patent Number: 4,802,855

[45] Date of Patent: Feb. 7, 1989

[54] WORD ASSOCIATION LABEL TEACHING METHOD

[76] Inventor: Harry E. Wood, 6465 Oakland Dr., New Orleans, La. 70118

[21] Appl. No.: 195,038

[22] Filed: May 17, 1988

[51] Int. Cl.⁴ ............................................ G09B 19/08
[52] U.S. Cl. .................................... 434/157; 283/46; 434/170
[58] Field of Search ............... 434/157, 156, 167, 168, 434/172, 170; 283/46

[56] References Cited

U.S. PATENT DOCUMENTS

| | | | |
|---|---|---|---|
| 388,486 | 8/1888 | Hall | 434/172 |
| 889,515 | 6/1908 | Foley | 434/159 |
| 3,380,176 | 4/1968 | Kling et al. | 434/168 X |
| 3,474,554 | 10/1969 | Des Ormeaux | 434/157 X |
| 3,888,025 | 6/1975 | Schmeider | 434/157 |
| 4,183,154 | 1/1980 | Dykes | 434/167 |
| 4,336,020 | 6/1982 | Zacharin | 434/157 |
| 4,702,700 | 10/1987 | Taylor | 434/168 |

OTHER PUBLICATIONS

"Words Make a Game", Washington Post, Mar. 8, 1964, p. F24.

*Primary Examiner*—William H. Grieb

[57] ABSTRACT

The "Word Association Label Teaching Method" consists of foreign language word association labels that come on sheets and that peel off and are restickable. These sheets are in book or binder form (FIG. I). On these sheets is printed the English word followed by several peel off labels with the foreign language equivalent of the English (FIG. II). The foreign language label peels off for adhering to the described object (FIG. III).

1 Claim, 1 Drawing Sheet

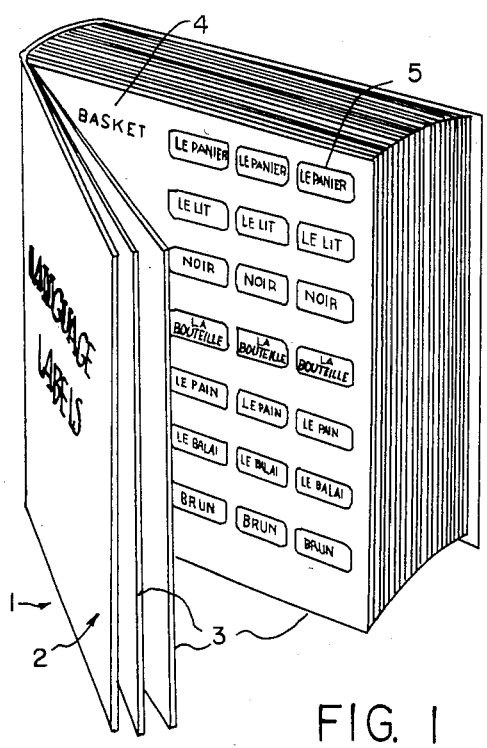
FIG. 1
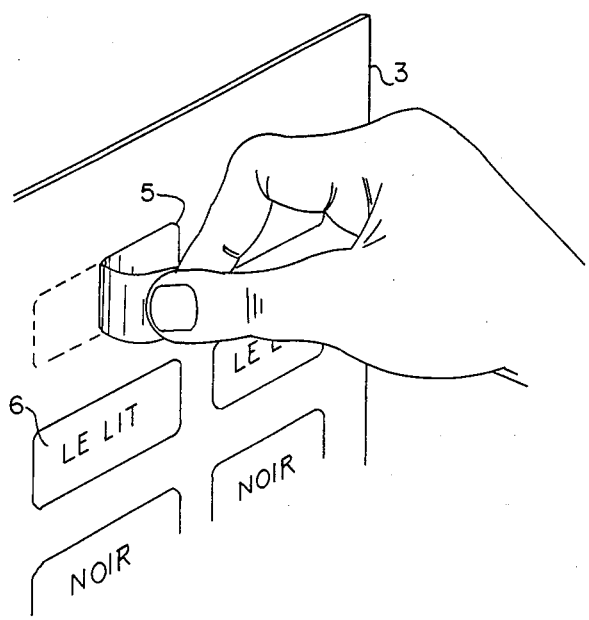
FIG. 3
| BASKET | LE PANIER | LE PANIER | LE PANIER |
| BED | LE LIT | LE LIT | LE LIT |
| BLACK | NOIR | NOIR | NOIR |
| BOTTLE | LA BOUTEILLE | LA BOUTEILLE | LA BOUTEILLE |
| BREAD | LE PAIN | LE PAIN | LE PAIN |
| BROOM | LE BALAI | LE BALAI | LE BALAI |
| BROWN | BRUN | BRUN | BRUN |
FIG. 2

WORD ASSOCIATION LABEL TEACHING METHOD

BACKGROUND OF INVENTION

1. Field of Invention

It is a well acknowledge principle that to learn a new foreign language the person must think in that language. Repetition and association in that language is the key to accomplishing this.

In the vast majority of cases, with the present school teaching system, the students have a textbook and a dictionary. These textbooks show the words (in the case of English-French) in English and the French equivalent. Whether it be nouns, adjectives, or verbs this promotes thinking of the desired word in English and then translating into French from memory. With this approach alone the ability to fluently speak and understand a new language will take an unnecessarily long time with excessive effort.

This invention offers the repetition and association necessary for learning by allowing the means to have hundreds and hundreds of items labeled with the foreign language word that describes it. Adjectives such as color, quantity, etc and verbs related to the object such as bed—to sleep, door—to open, to close, etc. can also be adhered to the object. If the objects in the home were labeled, the repetition and exposure would be many times daily. Learning and retention would take place with minimal effort.

2. Prior Art

A patent search was conducted through the files of the U.S. Patent and Trademark Office for "Methods of Teaching a Foreign Language". The classes searched were 434/157, 171, 168, 273/299, 293. The following patents were noted:

U.S. Pat. No. 388,486—I. F. hall—Aug. 28, 1888 Discloses an "Educational Apparatus", a frame device for holding cards.

U.S. Pat. No. 3,888,025—D. Schmieder—June 10, 1975 Discloses a "Teaching Game" using five piece jigsaw puzzles.

U.S. Pat. No. 3,380,176—F. R. Kling—Apr. 30, 1968 Discloses an "Educating Device/Game" which is another style frame device for holding cards.

U.S. Pat. No. 4,336,020—D. Zacharin—June 22, 1982 Discloses a "Jigsaw Puzzle" used as a teaching aid.

U.S. Pat. No. 3,474,544—J. P. Des Ormeaux—Oct. 28, 1969 Discloses a "Dairy Product Ordering Device" using silhouettes of dairy itetms to be ordered.

U.S. Pat. No. 4,183,154—E. Dykes—Jan. 15, 1980 Discloses an "Instructional Chair", not related to foreign language teaching.

U.S. Pat. No. 4,702,700—C. Taylor—Oct. 27, 1987 Discloses an "Activity Book" with magnets which is another style of card holder device.

U.S. Pat. No. 889,515—J. Foley—June 2, 1908 Discloses an "Educational Device" which is another style card holder.

None of the patents, or a combination thereof, reveal a method of teaching a foreign language as disclosed in the subject invention.

3. General Discussion of Invention

The "Word Association Label Teaching Method" comprises a book or other methods of holding pages. On these pages are printed English words and contain a multitude of peel off and restrickable labels with the foreign language equilviant of those words. These labels are for removal and adherence to the object to which they refer, such as "door—la porte", "window—le fenetre", "chair—la chaise", etc. Verbs and adjectives can also be incorporated when they refer to the object, "to open—ouvrir", on the door, "white—blanche" on a white object, etc. They can be used in the home, school, office, etc. The association and repetition in the foreign language that this invention offers is enormous. Used in combination with a textbook and classroom work, this would offer a considerable boost to learning. This repetition directly in the foreign language without first the English and then the memorized translation is the key to speaking and understanding the language.

Although "English-French" was used as an illustration, this invention is intended to cover any foreign language.

BRIEF DESCRIPTION OF THE DRAWINGS

In the drawing:

FIG. I shows the invention in its complete and assembled form, that is a multitude of pages bond in book or binder form.

FIG. II shows an example of individual pages with the English words printed on the page and the foreign language equivalent word printed on several peel off labels. These labels are restickable.

FIG. III shows peel off foreign language word lables.

English-French is used on the drawing for illustration. The invention is for all foreign languages.

DESCRIPTION OF THE PREFERRED EMBODIMENTS

The "Word Association Label Teaching Method" (1) as shown in FIG. I consists of a binding means and cover (2) which holds many pages (3). On each page (3) are the printed English words (4), which are not removable, listed in alphabetical order. Next to each printed word (4) are several peel off and restrickable labels (5). Printed on these labels (5) is the foreign language equivalent word (6) for the English word (4). It is to be understood that details herein are to be interpreted as illustrative and not in a limiting sense.

What is claimed is:

1. A "Word Association Label Teaching Method" for teaching a foreign language consisting of:
   (a) peel off and restrickable labels upon which are printed foreign language words such as nouns, verbs, adjectives, etc., to be adhered to the object to which the word refers;
   (b) sheets (pages) upon which English words are listed alphabetically followed by several peel off labels with the foreign language equivalent of that word printed on them as described in part (a);
   (c) a cover or binding means designed to hold many sheets or pages as described in part (b);
   (d) the peel off labels described in part (a) are of different colors to indicate nouns, verbs adjectives, etc.

* * * * *